(12) United States Patent
Wittkotter

(10) Patent No.: US 10,019,759 B2
(45) Date of Patent: Jul. 10, 2018

(54) REAL-TIME PROBABILITY DETERMINATION BASED ON TECHNICAL INDICATORS IN A FINANCIAL INSTRUMENT ENVIRONMENT

(71) Applicant: Erland Wittkotter, Las Vegas, NV (US)

(72) Inventor: Erland Wittkotter, Las Vegas, NV (US)

( * ) Notice: Subject to any disclaimer, the term of this patent is extended or adjusted under 35 U.S.C. 154(b) by 0 days.

(21) Appl. No.: 15/629,676

(22) Filed: Jun. 21, 2017

(65) Prior Publication Data

US 2017/0365000 A1    Dec. 21, 2017

Related U.S. Application Data

(60) Provisional application No. 62/352,595, filed on Jun. 21, 2016, provisional application No. 62/522,771, filed on Jun. 21, 2017.

(51) Int. Cl.
*G06Q 40/04* (2012.01)
*G06F 17/18* (2006.01)

(52) U.S. Cl.
CPC ............ *G06Q 40/04* (2013.01); *G06F 17/18* (2013.01)

(58) Field of Classification Search
None
See application file for complete search history.

(56) References Cited

U.S. PATENT DOCUMENTS

| 7,715,827 | B2 | 5/2010 | Yoo |
| 7,908,242 | B1 | 3/2011 | Achanta |
| 8,073,840 | B2 | 12/2011 | Smith et al. |
| 8,631,034 | B1 | 1/2014 | Peloski |
| 9,275,155 | B1 | 3/2016 | Smith |

(Continued)

FOREIGN PATENT DOCUMENTS

WO    2001027844 A1    4/2001

OTHER PUBLICATIONS

PCT/US2017/038620, PCT International Search Report and the Written Opinion, dated Sep. 1, 2017.

(Continued)

*Primary Examiner* — Robert R Niquette
(74) *Attorney, Agent, or Firm* — Kunzler, PC

(57) ABSTRACT

A method for providing a real-time probability includes generating a model based on time-series historical data for a financial instrument, the model built from technical indicators of the financial instrument based on extracted components of the time-series historical data and goal values for the financial instrument, applying a transform to the model, the transform generating a quantile vector associated with the financial instrument based on quantile values derived from the model for the financial instrument, compiling a composite index of quantile vectors, each of the quantile vectors corresponding to a plurality of samples having time-series historical data similar to the financial instrument, the composite index including a single sequential range of vector values, and generating a probability for the financial instrument to reach the goal values by determining an average number of quantile vectors of the composite index matching the quantile vector of the financial instrument.

20 Claims, 5 Drawing Sheets

(56) References Cited

U.S. PATENT DOCUMENTS

| | | |
|---|---|---|
| 2006/0009213 A1 | 1/2006 | Sturniolo et al. |
| 2010/0005054 A1 | 1/2010 | Smith et al. |
| 2010/0030799 A1* | 2/2010 | Parker .................... G06Q 40/04 705/37 |
| 2011/0113131 A1 | 5/2011 | Duanmu et al. |
| 2011/0218978 A1 | 9/2011 | Hong et al. |
| 2012/0131137 A1 | 5/2012 | Singh et al. |
| 2012/0209896 A1 | 8/2012 | Raymond |
| 2012/0330719 A1* | 12/2012 | Malaviya ............... G06Q 30/02 705/7.31 |
| 2013/0254258 A1 | 9/2013 | Agarwalla et al. |
| 2013/0339979 A1 | 12/2013 | Hilton |
| 2014/0317021 A1* | 10/2014 | Weber .................... G06Q 40/06 705/36 R |

OTHER PUBLICATIONS

PCT/US2017/041664, PCT International Search Report and the Written Opinion, dated Sep. 21, 2017.
PCT/US2017/038617, PCT Written Opinion of the International Searching Authority, dated Sep. 12, 2017.
PCT/US2017/038617, PCT International Search Report, dated Sep. 12, 2017.

* cited by examiner

REAL-TIME PROBABILITY DETERMINATION BASED ON TECHNICAL INDICATORS IN A FINANCIAL INSTRUMENT ENVIRONMENT

RELATED APPLICATIONS

This application claims priority to U.S. provisional application 62/352,595 filed on 21 Jun. 2016. This application also claims priority to U.S. provisional application 62/522,771 filed on 21 Jun. 2017.

The above applications are incorporated herein by reference in their entirety.

BACKGROUND OF THE INVENTION

The claimed invention relates to financial instrument trading in general, and specifically to the process of providing real-time probability metrics for one or more financial instruments.

Agents who deal in financial products such as loans, debt, stock, and bonds, rely heavily on market predictions and the ability to identify patterns and trends which might indicate a favorable transaction opportunity. However, with many day traders utilizing the same approaches, the advantage is lost. Additionally, the activity of many high-frequency or other machine-driven trading systems can anticipate and influence the activities of the human agents to take advantage of the approach they use.

SUMMARY OF THE INVENTION

The present invention has been developed in response to the present state of the art, and in particular, in response to the problems and needs in the art that have not yet been fully solved by currently available financial instrument probability systems, apparatuses, and methods. Accordingly, the claimed inventions have been developed to provide data protection systems, apparatuses, and methods that overcome shortcomings in the art.

A method for providing a real-time probability includes generating a model based on time-series historical data for a financial instrument, the model built from one or more technical indicators of the financial instrument based on one or more extracted components of the time-series historical data and goal values associated with the financial instrument, applying a transform to the model, the transform generating a quantile vector associated with the financial instrument based on one or more quantile values derived from the model for the financial instrument, compiling a composite index of quantile vectors, each of the quantile vectors corresponding to a plurality of samples having time-series historical data within a similarity threshold relative to the time-series historical data of the financial instrument, the composite index including a single sequential range of vector values, and generating a probability for the financial instrument to reach the goal values by determining an average number of quantile vectors of the composite index matching the quantile vector of the financial instrument.

A computer program product includes a computer readable storage medium having program instructions embodiment therewith. The program instructions are readable/executable by a processor to cause the processor to generate a model based on time-series historical data for a financial instrument, the model built from one or more technical indicators of the financial instrument based on one or more extracted components of the time-series historical data and goal values associated with the financial instrument. The program instructions are readable/executable by the processor to cause the processor to further apply a transform to the model, the transform generating a quantile vector associated with the financial instrument based on one or more quantile values derived from the model for the financial instrument The program instructions are readable/executable by the process to cause the processor to further compile a composite index of quantile vectors, each of the quantile vectors corresponding to a plurality of samples having time-series historical data within a similarity threshold relative to the time-series historical data of the financial instrument. The composite index includes a single sequential range of vector values. The program instructions are readable/executable by the process to cause the processor to further generate a probability for the financial instrument to reach the goal values by determining an average number of quantile vectors of the composite index matching the quantile vector of the financial instrument.

A computer system includes a processor, a memory accessible by the processor, and a computer readable medium having instructions encoded thereon to generate a model based on time-series historical data for a financial instrument, the model built from one or more technical indicators of the financial instrument based on one or more extracted components of the time-series historical data and goal values associated with the financial instrument, apply a transform to the model, the transform generating a quantile vector associated with the financial instrument based on one or more quantile values derived from the model for the financial instrument, compile a composite index of quantile vectors, each of the quantile vectors corresponding to a plurality of samples having time-series historical data within a similarity threshold relative to the time-series historical data of the financial instrument, the composite index including a single sequential range of vector values, and generate a probability for the financial instrument to reach the goal values by determining an average number of quantile vectors of the composite index matching the quantile vector of the financial instrument.

It should be noted that references throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
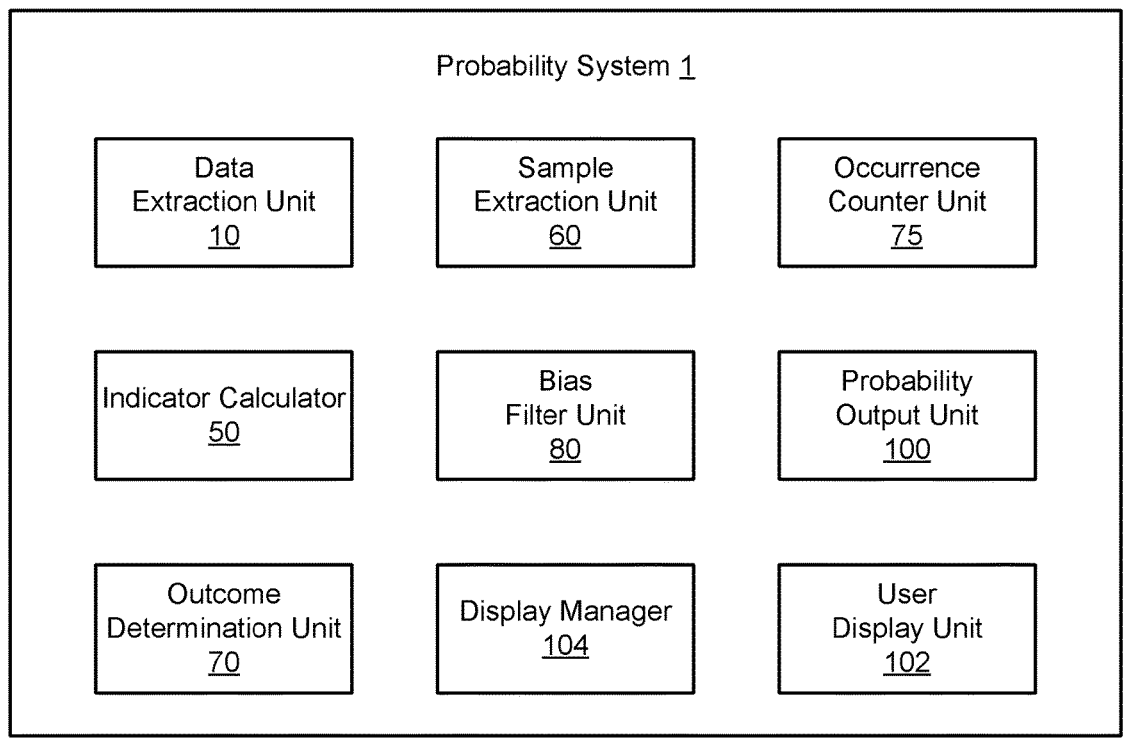
FIG. 1 is a schematic block diagram of one embodiment of a probability system 1.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely, parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Because they are, as a group, predictable in their behavior, human agents are sometimes out-performed by automated trading systems. Some of these opposing sides have the capital and/or the number of shares to turn price movements around by supplying the market with so many shares and/or orders so that the supply and demand is forced out of balance and the market of that stock is moved in the new/different direction than it would have naturally. Additionally, automated trading systems have the ability to create orders which are removed before they are filled in order to create only the impression that a higher demand is in a certain direction of the market.

In some markets, these opposing trading sides to retail traders are also using and operating trading computer systems and trading algorithms that are able to analyze more detailed data, which are called Level 2 trading data. These Level 2 data contain detailed information about the size of buying or selling orders. Beside short-term traders, there are also institutional traders and automated high-frequency trading systems which can be distinctively identified through the sizes of their orders. High-frequency trading systems are trading small order sizes, while institutional traders are trading very large order sizes. Additionally, the majority of orders done by retail traders are managed by a few market makers. Therefore, automated trading systems can detect, with reasonable accuracy, when ordinary small investors, day and short-term traders become aware of an opportunity for benefiting from trade situations that they consider an opportunity to make money. The better usage of Level 2 data by machine algorithms is causing an information asymmetry between human-traders and algorithms with the algorithms taking an asymmetric trading advantage. Moreover, these automated trading systems can detect the changes in speed in which new orders are coming in and/or speed in which short-term traders are exiting their positions. Often, these trading systems use a price that these systems have identified as an optimal turn-around price using statistics of assumed target price and stop loss distributions (i.e. a probability distribution of the expected take profit and stop loss price level) generated from big data analysis of previous traders' behavior. When these trading systems become active and apply their resources to turn the market around, the market may be impacted without signals that human traders would be able to detect. Therefore, traders who have investment which are expecting a large gain hoping that their profit target is still attainable will, too late, observe the market moving against their position and contrary to natural factors. In one example, if the prices fall low enough, the agents may feel that they have to sell or they may lose even more money if they stay in the trade. Because these traders would then sell the stock at their stop loss level, a price which is usually below the purchase price, these traders have realized a loss, while the trading systems, which may have sold the stock short, (i.e. a strategy of selling a stock that these systems don't own) with the expectation of buying back the stock for a lower price. The automated trading system then buys back the stock at the low stop loss price back, at which an ordinary trader has just capitulated. In this way, small traders lose in the zero-sum game of short-term trading and cannot predict such movement as these short-term price movements have virtually no reason in news or economic reality.

Furthermore, short-term algorithmic or machine trading doesn't need to have or take any news or economic reason for a price movement or may ignore relevant news for its buying or selling decision. Moreover, the algorithms are designed to win in the short-term zero-sum game in which most human traders will lose their money to the ma-chine algorithms.

In other financial transactions, for example with loans, debt, or bond transactions, the default risk and other profit reducing or loss increasing risks are estimated and summarized via a credit rating or associated to a credit rating. A compensating reward via interest is being calculated from that credit rating system. In another context, insurance companies calculate their risk or the probability for paying out an estimated amount is determined based on this risk and what kind of premium they want to have from their clients. Although the idea of associating probabilities to certain risk-to-reward ratios in trading is known to traders, the practical applicability of this approach is very limited because the success probability is usually estimated or guessed based on limited data and is not formally derived because of a lack of an appropriate system. Guessing may also be tainted by bias or wishful thinking of the person as well as his/her mental state.

Embodiments described herein relate to a system to calculate and extract technical indicators from a time-series of price data, associating each calculated indicator values to quantile values (or quantile vector/array values) and searching for events with the same quantile values (or quantile vector/array values) within a database of previous price or time-series data.

In some embodiments, the system creates, extracts, selects or generates a sample of events with the same quantile (or quantile vector/array values) from a sample database. The system further checks the history and context of each event (i.e. if price is reaching profit level, loss level, neither profit nor loss level—i.e. applying a criteria to each price data from a single time-series with the extracted collection of time-series samples).

In some embodiments, each event is evaluated over a given time-range (called outcome determination). Some embodiments include calculating, base on the number of matching samples, a probability for a similar occurrence. In some embodiment, the probability is the number of occurrences of the sample divided by the total number of events which resulted in the corresponding event. These variables may include profit level, loss level, neither profit nor loss level which is being determined for a time-range. In some embodiments, these variables can be calculated, set by the operator prior to its use, set via a default value, or otherwise determined.

As used herein, "probability" is the measure of the likeliness that an event will occur in the future. It is also a measure of a belief or a degree of assurance in which the certainty that a statement or an outcome will occur in the future is quantified. In some embodiments, the probability statement about the future is associated to the probability derived from the frequency of similar of same events which have happened in the past under the same or very similar conditions or circumstances. This association can then also be improved as a matter of additional calibration. In some embodiments, the frequency definition of past events and the degree of believe or certainty definition of future events is equivalent or can be made equivalent using additional calibration or correlations based on past data from past events.

In some embodiments, the probability is quantified as a number between 0 and 1 (where 0 indicates impossibility and 1 indicates certainty). The higher the probability of an event, the more certain it is that the event will really occur. Randomness can be described as the lack of pattern or predictability in events. It is known that all kind of events can happen after a price record is being analyzed or being observed—however, the same information is seen by a large range of traders and trading systems and there is a propensity for an outcome as defined by the corresponding probability. Although a single event may not be predicted even after determining the corresponding probability, over a larger ensemble of similar event the statistical average is within the vicinity of the probability plus or minus the natural statistical error.

Conditions used in probabilities are relevant, which means the event is dependent on the conditions or the context that is being studied. In some embodiments, changes in the conditions or context necessitate also changing the probabilities of an outcome. On the other side, the conditions are irrelevant or equivalent expressed when changes in the conditions don't have an impact on changing the probabilities of an outcome. In some embodiments, the probabilities can be sensitive, in various degrees, to the underlying conditions.

In some embodiments, derivative values, i.e. values that are calculated via mathematical formulas using data extracted from events, are considered as conditions. In some embodiments, the values within the conditions are taken from records that are related to the same, previous, or earlier time steps. The conditions can be related to or calculated from price data, or may be associated with or calculated from indicators de-rived from price data and/or additional fixed or variable values provided via a user interface. In some embodiments, one or more conditions are related to, include, or uses a comparison operator. In some embodiments, the comparison operator includes equal, less than, less than or equal, greater than, greater than or equal. In some embodiments, a given single value that is compared to another value which may include an indicator value. In some embodiments, the operators "is" and "is not" and "has" and "has not" and "correlated" and "not correlated" and "proportional" and "not proportional" are used within a condition.

In some embodiments, the data to be analyzed includes price data for stocks, shares, equities, exchange traded funds (ETF), index funds, futures contracts, options, Forex currency pairs, commodities, or other financial instrument. While a certain type of financial instrument may be described below, the description provided herein applies to a wide range of financial instruments. In some embodiments, the financial instrument includes data taken over a given time-frame.

In some embodiments, financial instruments traded at exchanges or auctions are accessible and traded via electronic data networks or they are traded in open outcry or they are traded over the counter. In some embodiments, the price data include tick data, which are used in reference to the direction of the price of a stock, with an "uptick" refer-ring to a trade where the transaction has occurred at a price higher than the previous transaction, and a "downtick" refer-ring to a transaction that has occurred at a lower price. In another embodiment, the price data include data tuples such as Open, High, Low, Close data (OHLC), for the price movement within a given time-frame. In some embodiments, the price data is provided as bid prices, i.e. the best/highest price that a buyer is giving or ask prices, i.e. the best/lowest price that a seller is giving. In some embodiments, the prices in the OHLC data tuple are prices that have actually turned into buy/sell transactions.

In some embodiments, the OHLC price data is a description for the price action within a predetermined (i.e. selected, calculated, set by user, or by default) or periodic time-frame. For example the time frame may be 1, 2, 5, 10, 15, 30, 60 or 90 minutes over a day, a week, a month, or any other time frame. In some embodiments, the OHLC data includes an opening price at the beginning of a time-frame and a closing price at the end of the time-frame. In some embodiments, the OHLC includes the highest and the lowest price. In some embodiments, the OHLC data are based on actual trade at prices within the OHLC price range. In some embodiments, the OHLC data are displayed in so called candlesticks, in which the information of open prices are larger than the close price or the other way around (which may be represented by a change of color.)

In some embodiments, the price data that is analyzed can also be taken from the depth of market (DOM) also described as the ladder, order book, depth, and sales). In some embodiments, the DOM shows the size of standing bids and offers for a particular financial product. In some embodiments, the DOM displays a measure of the number of open buy and sell orders for a security or currency at different prices. In some embodiments, the DOM measure provides an indication of the liquidity and depth for a security, commodity, or currency at different price points.

In some embodiments, Level 2 price data includes ask/bid prices together with the quantities of individual yet unfilled orders. In some embodiments, the term "indicator" refers to an observed value of a variable or function that uses and represents data from a data stream. In some embodiments, technical indicators are mathematical calculations based on historic or real-time time-series data. In some embodiments, the technical indicators are associated with one or more of a particular price, volume, and potentially open interests. In some embodiments, the technical indicators describe and potentially forecast financial market direction. In some embodiments, volume, open interest, and other data extracted from the trading process are considered price data. In some embodiments, indicators and overlays are considered conditions or value or indicator circumstances and are thereby used inter-changeably with conditions. In some embodiments, technical indicators are plotted in conjunction with price data in charts and used as an approach for curve-fitting. In some embodiments, technical indicators are used to predict the market trend or market sentiment. However, in some embodiments, based on their nature of some versions as depending on past data, they can be lagging indicators.

Examples of technical indicators fall into the categories of technical overlays, curve-fitting methods and technical indicators. Examples of technical overlays include Bollinger Bands (shows the upper and lower limits of "normal" price movements based on the standard deviation or volatility of prices), Chandelier Exits (an indicator that can be used to set trailing stop-losses for both long and short position), Ichimoku Cloud (an indicator that defines support and resistance, identifies trend direction, gauges momentum, and provides trading signals), Kaufman's Adaptive Moving Average (KAMA) (a moving average that ac-counts for volatility and which automatically adjusts to price behavior), Keltner Channels (a chart overlay that shows upper and lower limits for price movements based on the average true range of prices), a Donchian Channel (formed by taking the highest high and the lowest low of the last n periods), Moving Averages (MA) (chart overlays that show the average value over time whereby MA are calculated using the Simple Moving Averages (SMAs) and Exponential Moving Averages (EMAs)), Moving Average Envelopes (a chart overlay consisting of a channel formed from simple moving averages), Parabolic SAR (a chart overlay that shows reversal points below prices in an uptrend and above prices in a downtrend), Pivot Points (a chart overlay that shows reversal points below prices in an uptrend and above prices in a downtrend), Price Channels (a chart overlay that shows a channel made from the highest high and lowest low for a given period of time), Volume by Price (a chart overlay with a horizontal histogram showing the amount of activity at various price levels), Volume-weighted Average Price (VWAP) (an intraday indicator based on total dollar value of all trades for the current day divided by the total trading volume for the current day), and ZigZag (a chart overlay that shows filtered price movements that are greater than a given percent-age. Other technical overlays and imaging approaches are also contemplated.

Some examples of technical indicators include: Accumulation/Distribution Line (lines that combine price and volume to show how money may be flowing into or out of a stock), Aroon Up and Aroon Down (an indicator to determine whether a stock is trending or not), Aroon Oscillator (a measure derived from the difference between Aroon Up and Aroon Down), Average Directional Index (ADX) (an indicator that shows whether a stock is trending or oscillating), Average True Range (ATR) (an indicator that measures a stock's volatility), BandWidth (an indicator that shows the percentage difference between the upper and lower Bollinger Band), % B Indicator (an indicator that shows the relationship between price and standard deviation bands), Commodity Channel Index (CCI) (an indicator that shows a stock's variation from its "typical" price), Coppock Curve (an oscillator that uses rate-of-change and a weighted moving average to measure momentum), Correlation Coefficient (an indicator that shows the degree of correlation between two securities over a given time frame), Chaikin Money Flow (CMF) (an indicator that combines price and volume to show how money may be flowing in-to or out of a stock), Chaikin Oscillator (an indicator that combines price and volume to show how money may be flowing in-to or out of a stock), Point Price Momentum Oscillator (PMO) (an momentum indicator that tracks a stock's rate of change), Detrended Price Oscillator (DPO) (a price oscillator that uses a displaced moving average to identify cycles), Ease of Movement (EMV) (an indicator that compares volume and price to identify significant moves), Force Index (a simple price-and-volume oscillator), Mass Index (an indicator that identifies reversals when the price range widens), Moving Average Convergence/Divergence Oscillator (MACD) (a momentum oscillator based on the difference between two EMAs), MACD-Histogram (a momentum oscillator that shows the difference between MACD and its signal line), Money Flow Index (MFI) (a volume-weighted version of RSI that shows shifts in buying and selling pressure), negative Volume Index (NVI) (a cumulative volume-based indicator used to identify trend reversals), On Balance Volume (OBV) (combines price and volume to show how money may be flowing into or out of a stock), Percentage Price Oscillator (PPO) (a percentage-based version of the MACD indicator), Percentage Volume Oscillator (PVO) (the PPO indicator applied to volume instead of price), Price Relative/Relative Strength (a technical indicator that compares the performance of two stocks to each other by dividing their price data), Pring's Know Sure Thing (KST) (a momentum oscillator based on the smoothed rate-of-change for four different time frames), Pring's Special K (a momentum indicator that combines short-term, intermediate, and long-term velocity), Rate of Change (ROC) and Momentum (an indicator that shows the speed at which a stock's price is changing), Relative Strength Index (RSI) (an indicator that shows how strongly a stock is moving in its current direction), RRG Relative Strength (Uses RS-Ratio to measure relative performance and RS-Momentum to measure the momentum of relative performance), Slope (an indicator that measures the rise-over-run for a linear regression), Standard Deviation (Volatility) (a statistical measure of a stock's volatility), Stochastic Oscillator (Fast, Slow, and Full) (shows how a stock's price is doing relative to past movements), StochRSI (an indicator that combines Stochastics with the RSI indicator), TRIX (a triple-smoothed moving average of price movements), True Strength Index (an indicator that measures trend direction and identifies overbought/oversold levels), Ulcer Index (an indicator designed to measure market risk or volatility), Ultimate Oscillator (an indicator that combines long-term, mid-term, and short-term moving averages into one number), Vortex Indicator (an indicator designed to identify the start of a new trend and define the current trend), and Williams % R (an indicator that uses Stochastics to determine overbought and oversold levels). Other examples of technical indicators are also contemplated.

In some embodiments, the above technical overlays and indicators have either one or several input parameters, except used price data, and they can be applied on data of different time frames. Some indicators, like candle-stick pattern, don't have any additional parameter. In some embodiments, the formulas within the indicators can use the open, low, high or the close price or the volume as a parameter. In some embodiments, the output of these indicators includes one or more output values. In some embodiments, a yes or no for a specific pattern is an indicator. In some embodiments, a similarity factor expressing the similarity to a given pattern is an indicator.

In some embodiments, numerical derivatives of first order (i.e. a function which gives the slope of a curve) or higher order of these indicators are considered indicators and/or conditions. In some embodiments, mathematical operations using indicators like average, standard deviations, percentiles, and quantiles are to be considered indicators and/or conditions.

In some embodiments, price information and the change of prices are connected to the sentiment of the market which is an expression for the optimism or pessimism, hope, or fear related to the corresponding market or financial instrument and which is correlated to the change of price, i.e. temporary up or down trends. In some embodiments, price data is considered to move sideways (i.e. not too much up and not too much down). In some embodiments, these sentiments or biases are categorized as very bullish, bullish, neutral, bearish, or very bearish.

In some embodiments, the system includes a data extraction unit. In some embodiments, the data extraction unit extracts data from a stream of received and or timely changing data according to a given criteria. In some embodiments, a stream of changing data is a time-series of data or separate data from a stock exchange. In some embodiments, the stream of changing data can be displayed either in a chart or with some other displaying or visualization (i.e. components or units designed to display or visualize data, such as a user interface on a computer or on a mobile devise like a smart phone, tablet, laptop, or other display device, or a standalone monitor receiving data from a remote source). In some embodiments, the stream of changing data includes constant data that have the potential to change to a different data value.

In some embodiments, the price data record for which the probabilities are being calculated is within a situation, condition, or context or in circumstances or a state or has past surroundings that can be described with technical or mathematical indicators and values extracted from indicators.

In some embodiments, the data extraction unit determines the values related to the condition. In some embodiments, the data extraction unit includes functional features of a condition determination unit. In other embodiments, the data extraction unit is separate from the condition determination unit.

In some embodiments, the data extraction unit determines values of selected indicators. In some embodiments, the indicators are based on the identified parameters at a selected price or prices. In some embodiments, the condition that the condition determination unit is extracting, calculating or determining includes an indicator or a set of indicators that is within a range of corresponding indicator values.

In some embodiments, the indicators are selected by a user or determined and associated to a user account by another technical component, unit, or computational device of an electronic device. In some embodiments, a data record extraction unit (i.e. a component or unit that extracts data on a computer system) determines, calculates, or extracts data values. In another embodiment, the data record extraction unit extracts price levels related to the criteria or goal criteria (i.e. a take profit (TP) or a stop loss (SL) level or both price-level) which have calculated probabilities within a given predetermined (i.e. selected, calculated, set by user, or set by default) timeframe.

In some embodiments, the extracted data is functionally summarized, executed, and extracted by a goal extraction unit. In some embodiments, the goal extraction unit determines the time (P-time) in which the data stream reaches the corresponding level (TP and/or SL). In some embodiments, the goal extraction unit is a component or unit that extracts data related to the goal (e.g. the take profit level, the stop loss price-level), and the timeframe in which the user wants to have the data stream reach the corresponding goal. In some embodiments, the goal is defined by at least one of a risk-to-reward ratio, the selected portfolio, and the trades type or duration (i.e. long, short or both).

In some embodiments, the goal selection unit reads and uses data input by the user or extracted values that are input to set or read TP and/or SL values and P-time value. In other embodiments, the goal selection unit includes a component to extract said data from one or more of a visual user interface, a corresponding database or filesystem, and data provided or recommended by a local or remote data storage or communication component or unit. In some embodiments the goal extraction unit extracts data related to a trading situation in conjunction with displaying time-series data (e.g. a chart software using corresponding lines within said chart software) and stores the SL and/or TP and P-time values after it has been selected or determined once and/or is changing for said changed SL/TP values the corresponding P-time by a value related to the time left from the initial P-time values.

In some embodiments, the take profit and stop loss level are associated to percentage values with respect to the current (price) value of the time-series or with respect to the closing value of the previous candlestick value or with respect to the opening price of the trading day or any other price determined by the system operator or system developer or by the user or set by default. In some embodiments, the percentage value is transformed into an integer value by multiplying a price value with a large enough integer value, for example, 100 or 1000.

In some embodiments, the probability is calculated or determined by an outcome determination unit. In some embodiments, the probability calculation uses a sample of similar price data situations, in which said similar price data situations have the same set of quantile values or a similar quantile vector. In some embodiments, if one or more stop loss levels have been set, the probability calculation uses a pair consisting of one TP level and one SL level and determines if it is hitting either the corresponding stop loss level or corresponding take profit level or neither from a sample of price data while the initial price data has the same or similar quantile values (or quantile vector/array values) and the events within the sample are considered similar.

In some embodiments, the system calculates the probabilities for a set of stop loss level or take profit level and P-Time as defined by a list or a table or by an algorithm using predetermined (i.e. selected, calculated or set by user or by default) records or rules. In other embodiments, the probability is calculated for multiple time-steps within the time-range between initializing trade and P-time according to a list of time-values and a combination of a list of SL/TP level, P-time, and a time-value list.

In some embodiments, each extracted and/or calculated indicator value is associated with a quantile value, which, in some embodiments, is an integer value. In some embodiments, each price data record of the time-series is characterized by, and associated with, one or more indicator values from different indicator functions or is associated with values extracted from higher timeframes that correspond to lower timeframe price records. In some embodiments, corresponding rule-based quantile values are associated with each indicator function. In some embodiments, all calculated quantiles are then organized into corresponding quantile vector values that are then used to search in a database or table for associated references having price data with similar quantile vector values.

In some embodiments, the different quantile vectors are arranged in a single sequential range of integer values, also called quantile vector IDs. In some embodiments, the quantile vector IDs are calculated using a formula. In some embodiments, the quantile vector IDs can be used to determine the elements of the quantile vector.

In some embodiments, the search for similar trade situations is done in a table or system which manages the total set of references to price data with calculated and/or associated quantile values and/or quantile vector/array values.

In some embodiments, searching in a database of quantile values and price reference associations is also referred to herein as sampling. In some embodiments, sampling identifies a set of records having a given quantile vector or quantile vector ID to that of the examined trade situation. In some embodiments, a sample data extraction unit operates on the database or communicates with a data management system that manages the samples associated with the database. In some embodiments, the sample data extraction unit is a component or unit designed to extract a plurality of sample data. In some embodiments, the sample data extraction unit has the task to find and to extract one or more time-series that have the same quantile (vector/array) values as the quantile (vector/array) values provided by the data extraction unit on the system that is initially extracting data from the time-series data stream.

This database or file system, in the following also called sample database, which is used by the related sample extraction and or storage, is a component or unit that is used to get all sample data related to the above sample extraction, and extracts either all price data together with stock and time information or extracts references to said data available via another storage (like a remote DB or files on a remote filesystem) or it is providing only a smaller sub-set of said sample i.e. a subset of a predetermined (i.e. selected or set by user or by default) or calculated size of said sample data, i.e. extracted from that structure that provides full price data that are associated to the examined financial instruments at and for the corresponding time-range or time-spot.

In another embodiment of the invention, absolute price data are turned into percentage change values or relative price values either with already processed price data provided from the extracted OHLC records storage or transformed with a price value from corresponding financial instrument in a consistent way or dividing by a data values from a database or via data received and processed after they are queried from the database.

In another embodiment of the invention the time is being associated to events or property-related categories, so that probability values for a certain event happening within a certain time-range can be extracted via selection from comparable occurrences using a database or queried within a database.

In another embodiment of the invention the price data extracted for the database can also be transformed with some other mathematical, transformation function that makes price movements of largely different price amount ranges comparable.

In another embodiment of the invention only price data which have indictor values within a given predetermined (i.e. selected, calculated or set by user or by default) ranges are being included in said sample database. Also only examined price data with indicator values within the same range are associated to a quantile vector or quantile vector ID used for a search of said sample database.

Because the search within the full price database is done via association to a category or a quantile (vector/array) values or associated quantile vector IDs, the underlying stock symbol or financial instrument is in first approximation not significant and the probabilities are assumed to be independent of that feature. However, is it known that different stocks or financial instruments having different trading liquidity and therefore behaving differently when volatility is being associated or considered with respect to the trading volume. A similar observation or association of relevant trading behavior is being observed with respect to the belonging to an industry segment or sector and thereby an embodiment of the invention can provide sample data which consider said belonging to an industry segments or sectors.

A category according to this invention is a division of a given set of elements into subsets based on a common definition for the sub-division and each element within the subset is ac-cording to the definition of the sub-division of the same type. Each category can be associated to a name or to a numerical value or symbolic value. Stock Price pattern or candle-stick pattern or bias associations or news event associations or non-numerical metadata associations are associated according to the invention to categories and or sub-divided in sub-categories. If category names of categories or sub-categories are associated to numbers, in particular to integer numbers, then categories are according to the invention associated to quantiles and or can be described or managed by quantiles.

A method of describing the price behavior is volatility. In an embodiment of the invention, trading volume is associated to volatility, i.e. a lower trading volume is leading to a quicker change of price than heavily traded shares and samples are created and or extracted using a similar range of trading volume in a same time-range; in another embodiment of the invention, price range categories are associated to volatility and a lower priced shares have a relative larger volatility than higher priced shares and samples are created and or extracted using a similar range of price categories. In a preferred embodiment of the invention, the volatility is being measured with the indicator Average True Range (ATR) or via association to the corresponding implied volatility from options or another mathematical indicator is correlated to the relative size of the price movements. In ATR, the sensitivity to these changes in the volatility can be changed or adjusted via using smaller parameter values within the ATR indicator parameters. Furthermore, the numerical derivative on ATR values can be used to distinguish the speed of changes in the volatility or within a more general concept first derivatives measure the change of an indicator.

In a special embodiment of the invention, the changes in the probabilities are made dependent of the underlying financial instrument. E.g. futures contract could be studied by using only price data from the same contract type, e.g. eMini' s or Gold Futures, whereby these markets may have certain characteristics, which would vanish if the data are being blended with price data from other financial instruments.

Also, the change of a value from an indicator (or the first derivative over time) can be categorized and represented in quantiles as well. However, because changes over time or changes in speed (second derivative) don't have an upper limit, the association of values to the quantiles may include a rule on how to put values above a predetermined (i.e. selected, calculated or set by user or by default) threshold in the biggest and smallest quantile or via association to an extra category or quantile.

In an embodiment of the invention, the search of a sample or of a subset or events is done in the sample database using multi-column indices and or tables managing indices. In a special embodiment of the invention each query to the sample database has e.g. a corresponding index for the sample extraction. The quantile vectors are indexed, i.e. optimized for an efficient search for same values and references to price record data are being returned within a search of said index. In a special embodiment of the invention, an index is a composite index of an integer representing said quantile vector record and a reference to a corresponding price data record (stock, date, time) for which the quantile vector was generated. In another special embodiment of the invention for each price data records, the index is a composite index for multiple different quantile vectors, as e.g. the quantile vector has multiple associate indices each related to an indicator.

In a special embodiment of the invention an indicator that has multiple indicator values associated to it like e.g. the result of an algorithm that determine if a given price data record in the context of precious price records is part of multiple stock price patterns or candlestick pattern. The probability or definitiveness of the belonging to a pattern can be given by a factor which then is being associated to a quantile value per price record or per associated pattern. Moreover, the belonging of a given price data record to a bias, like, very bullish, bullish, neutral, bearish or very bearish can also be included in the index.

In another special embodiment of the invention, the association of a given price data record to a news event or the timely correlation to a news event can be categorized within a quantile value and included in an index. Additional information that have been calculated from the context of a given price record, which are being associated to said price record via metadata can be associated to quantile values and being included in an index, while multiple index values are referencing to the same price data record or group of price data records.

In a preferred embodiment of the invention the sample index is being used via querying said full index, so that the result of said query consist of elements that shares a common indicator value or consists of values that shares a common or associated indicator value range. Price data records references can be extracted from said sample index as a sample, in conjunction with additional information or metadata related to extracted events.

In another special embodiment of the invention, the algorithm to extract said sample can access several sample indices in order to get a set of references to price data records. E.g. an algorithm could extract data from an index with bullish or very bullish records and extract data from an index with associations to specific news information and or a combination of above mentioned special indices.

Once said sample data have been extracted, each element of said extracted sample or a subset of a sample is being considered an event or sample event and is being processed by the criteria application unit (later also being called outcome determination means or unit) in order to determine if in the comparable situation or condition has reached the level of the take profit or stop loss level within the given time range to the P-time; this step applied on a single or multiple events is also called outcome determination. The criteria application unit is taking for each sample event additional sequential price data (i.e. data related to sample events starting from the price data that has an associated quantile-vector values that is being common for the sample and price data that is being smaller than the max P-time; determining if and what price levels is being hit first or is being equal in its amount first within the corresponding goal data, which were extracted for the event within the extracted examined price situation. The price data are applied in the same sequence as they are associated to the ascending time values of the appearing price data. Said outcome determination is optionally determine the third outcome: i.e. none of price level are reached by the extracted price data within sample event within a given time range (P-time), i.e. nothing happens within sample event, which is being determined by said outcome determination unit.

Once all samples or sample events have been processed in the outcome determination unit i.e. once it is determined if the criterion hit first the corresponding price level or not hit criterion at all for each event within the sample, then each of the events in which the take-profit level was hit first, and events in which the stop loss hit first and events in which no-hit at all situations are being counted and compared or divided with the count of all samples, i.e. divided by the size of the sample; i.e. the sums of same event outcomes is being divided by the total number of events within the sample in order to get the associated and or estimated probability of said event.

In a preferred embodiment of the invention the data stream consists of price data e.g. from stock, Forex, options or commodity exchanges and the indicators are technical indicators on these OHLC price data.

Additionally, the values of the indicators are numerical values associated into an interval of values e.g. based on rounding to the next decimal number. The categorization of values is done using quantiles; the following quantiles have special names: the 2-quantile is called the median; 3-quantiles are called tertiles or terciles; 4-quantiles are called quartiles; 5-quantiles are called quintiles; 6-quantiles are called sex-tiles; 10-quantiles are called deciles; 12-quantiles are called duo-deciles; 20-quantiles are called ventiles; 100-quantiles are called percentiles; 1000-quantiles are called permilles. In a special embodiment of the present invention, the quantiles are either e.g. deciles or ventiles.

In an embodiment of the invention, the association of the indicator values with a quantile can be done using different methods. In a special embodiment of the invention the entire finite range of indicator values can be segmented in equidistant partitions.

In another embodiment of the invention, the segmentation of the indicator values is done via using the actual number from a very large sample so that approximately the same number of values is associated within each of the different quantiles; which means the association of indicator values is done via a non-equidistant segmentation of the indicator value range. Furthermore, for unbound indicators, a finite indicator range can be defined, which is either segmented in equidistant or non-equidistant partitions, while values above and/or below the finite range are associated to a corresponding upper or lower quantile.

In another embodiment of the invention, price and moving aver-age values can be transformed into range of values and/or into a bounded range of values that makes the values comparable between values from other stocks and/or time-series. In a special embodiment of the invention, the moving average value can e.g. be divided by a predetermined (i.e. selected, calculated or set by user or by default) and/or extracted price value, e.g. the initial opening price of the trading day or a computed value based on the initial price data record of said begin of trading day.

Furthermore, volatility is changing during the trading day, i.e. different intraday trading time periods have typically different volatility level based on amateur hour, professional hour and regular trading hours and potentially EST lunch time hour. In order to avoid larger probabilities due to higher volatility from a non-applicable time period, a special embodiment of the invention provides e.g. a correction to the price movement during these trading time-frames. If a sample is taken in the first trading hour, the amateur hour, and the original trading situation was during a later regular, less volatile trading hour, then values from the application of the criteria is being done on price values, which are corrected with a function that reduces the actual changes in values more to its expected volatility, in order to avoid a false positive detection within the criteria. Same would apply to a situation, in which the original to be tested values are taken in the more volatile amateur hour, while most of the sample were taken within the regular hour. In that case, the lack of volatility within the regular hour is being artificially enhanced by including e.g. a multiplier on the prices provided in the price sample data or processed with an additional function that is being applied on the price data so that the price data in said sample have a larger swing. The function that is applied is creating smaller or larger swings so that the associated average ATR is more in line with the average ATR of the original tested timeframe. This correction function can also include a random number generator in which a random number is used to make the corresponding values statistically equivalent or compatible.

Furthermore, price data within samples could contain gaps from after hour and pre-market hour trading and therefore give a take profit or stop loss signal that would not happen within regular trading hours. These gaps can be removed from the price data within a sample or within the price data database or within the generation of the corresponding indicator values. Additionally, the gap associated with increases of volatility can be removed via a corrective function applied on the price data.

Moreover, the impact of these gaps within the generation of indicators that uses records prior to a price gap can be calculated in a way via adding or subtracting the gap value on all values prior to that gap so that the removal for the price gap would remove the impact of said gap to the indicator values entirely.

A simple application of a take profit or stop loss level is not always appropriate and doesn't fully predict the price movement as it would be seen by a human trader. Because the data within the sample associated to the tested price situation are from other stocks related to different prices, different price expectations; therefore, the outcome determination according to an embodiment of the present invention can apply a method that can analyze all events within the sample and provides hints on better stop loss, take profit level values, with the intention to facilitate a corresponding optimization of gains. Knowing the distribution of (relative/percentage-wise) maximum gains and or loss within the sample (and within the P-time time-frame) can give the user/trader/operator a clearer indication where to put alternatively the take-profit and or stop loss level or which other combination of said levels could provide other insightful probability information—in particular with respect to the corresponding risk-to-reward ratios given by the TP/SL level; these additional information from the sample could in particular help a trader to overcome his bias from seeing the previous price movements of the tested trading situation.

In the following a distribution is being considered as a relationship between an outcome of a statistical value, variable, function, or experiment with its probability of occurrences. The distribution can be the frequency for each smallest value or unit of a value or summarized or aggregated over a range of values provided over the entire underlying value range.

Therefore, the appliance according to the invention can pro-vide a list of alternative stop loss, take profit price data that are associated to different risk-to-reward ratios and different outcome probabilities. These suggestion can be extracted from the extracted set of samples and sample-events for the above-mentioned price data distribution for alternative gain and loss scenarios at different P-time-frames and a server-sided outcome determination unit can send these data to the client.

In another embodiment of the invention the outcome determination unit is on the client and the sample data are sent to said client-sided outcome determination unit from the server.

Furthermore, a larger price move, which is being seen or anticipated by a trader based on his experience or based on other expectation, e.g. a price move to a support or resistance level or a price move between a price-channel; these price moves can e.g. be segmented by another client-sided goal management unit of the invention into smaller price-moves that are analyzed with respect to probabilities for intermediately set stop-loss and take-profit levels. Another embodiment of the invention could then e.g. modify the stop-loss and take profit levels and move within one or more steps the take-profit level more toward the target price as seen by the trader, whereby the stop loss level is being ratcheted up accordingly as well.

In a special embodiment of the invention the price distance between the initial entry price and the stop-loss price is segmented in 2, 3, 4 or any other number of segments or price step and a change of price level is being done by said price step or multiple of said price steps.

In another embodiment of the invention the stop-loss and take profit level is e.g. being set automatically using a given or predetermined (i.e. selected, calculated or set by user or by default) risk-to-reward ratio of e.g. 1 to 3, 1 to 4, 1 to 4.5 or any other ratio, which would exclude non-directional, or non-trending price-movements within the sample for the corresponding time-frame. The risk within risk-to-reward ratios is being taken from the difference between trade entry-price and the stop-loss-level, while the reward value is being taken from the difference between reward level and trade entry price; the values are normalized in a way so that the risk value is set to 1 and the reward value is being divided by the risk value. The percentage change per time-frame is then e.g. being adapted and comparable to the price-movement that is being determined by analyzing the real price movements of a large sample with stocks at a given volatility range. By using a given volatility range, which is measured by e.g. using ATR, a system according to the invention can determine which mini-mum threshold price is required to have e.g. 30% or any other percentage of all corresponding trades exceeding this price. Then this price is being considered or selected as the take-profit level at the given timestep for the given volatility range. The stop-loss level is then being calculated using the differences of take profit level to the currently examined price while said risk-to-reward ratio value with the take-profit price level is being used to calculate the stop-loss level. However, a real price movements would potentially hit the stop-loss level first before they hit within the timeframe the take-profit level. This behavior can be excluded when the statistical probability is being calculated within the outcome determination unit using additional information about indicators and quantiles within the tested or examined trade situation or within the given trade context.

In another embodiment of the inventions the risk-to-reward probabilities are calculated for the different quantiles and provided to the client in much finer granularity; moreover the probabilities are calculated e.g. for the risk-to-reward ratios 1:1, 1:1, 25, 1:1, 5, 1:2, 1:2.5, 1:3, 1:3, 5 and so forth, in both direction and for several time-steps.

Moreover, in another embodiment of the invention the information related to the probabilities of the different risk-to-reward ratios are being categorized into categories with respect to the propensity of indicating a change of trend, the continuation of a trend with respect to the time after the quantile-vector value has been determined or calculated at start time. Furthermore, the quantile vector can be associated to how often said quantile vector is being seen in or associated to a very bearish, bearish, neutral, bullish or very bullish trading context.

In another embodiment of the invention additional information related to the presumed propensity of indicating some trend or change of trend can e.g. being stored, updated, and or managed on a server or client-sided storage unit and or data management and or provided to the client and or made available for publication and or made available to use in conjunction or independently from the outcome determination unit.

In another embodiment of the invention, the sentiment of very bearish, bearish, neutral, bullish or very bullish can be calculated using the association of price/trend changes between a price record from a time-step before the currently examined price record and a price distribution segmented into standard deviations above and below the average, whereby neutral bias is being associated by +/−0.5 standard deviation (SD), and bullish between 0.5 SD and 1.5 SD and bearish −0.5 SD and −1.5 SD.

In another embodiment of the invention the probabilities for given risk-to-reward ratios are being calculated for several consecutive timeframes and via a value weighting algorithm applied to probabilities or expectations or distribution input values or via a function which parameters applied to said probabilities or expectations or distribution input values is being calculated or processed or determined or optimized by a neural network or a deep learning framework is being used to provide an in average better probability estimation output than the single probability values. Moreover, the probabilities can additionally being calculated in different time-fames, in particular higher time-frames and being used in above mention weighted function, neural networks and or deep-learning frameworks.

In a preferred embodiment of the invention, the probability data are e.g. being send from a server and being received by a client; moreover, these data are being received by a visualization unit on said client which is serving as the visual interface on the client and for the user. This visualization unit can be a hardware device specially dedicated to display said statistical data or a hardware dedicating to provide a trader an interaction with his broker while receiving statistical data or it can be an updateable software directly running on the device of the user that is displaying said statistical data or it can run within a browser of the device of that user and display said statistical data, whereby the data to be displayed on said visualization devices are generated remotely on a server.

The client hardware or software can display the probability data in different modes: Spot, Track and Study modes. The Spot Mode is displaying only the probability, expectation and/or price distribution and/or price/trend change distribution and/or the prices that separates the different trades biases of the currently analyzed or examined time-spot, which can be the current time or a previous time spot for a given trade situation. The Track Mode is displaying the probability, expectation and/or price distribution and/or price/trend change distribution and/or the prices that separates the different trades biases for consecutive time-spots within the charts on the same stock or equity, whereby previously data are either taken from the client DB or received from a remote server. The Study Mode is taking probability, expectation and/or price distribution and/or price/trend change distribution data and/or prices that separates the different trades biases from previous time-spots and is allowing the user to study the provided and or data on previous events more closely and independently of current market price events. In all modes, the following data types: probability data, expectation data and price data distribution data and prices that separates the different trades biases can be calculated, transmitted, received, stored and displayed by the client visualization unit.

In another embodiment of the invention the visualization and/or client unit is e.g. calculating, transmitting, receiving, storing and displaying statistical error data related to the probability, expectations and price data distribution and prices that separates the different trades biases. The error data can be the first or second standard deviation of the sample distribution. Above data and error data can also be pro-vided specifically for all trades biases and being stored and managed by said server-sided or client-sided storage.

Storing said data or data storage unit is a unit or component designed to store data either on a local or remote database system, a local or remote filesystem on a HDD or SSD or RAID storage system, or in an internal memory of the electronic processing unit or a remote computational or electronic storage system or a distributed storage system in which different types of data or data generated at different times are being stored on different server systems or different storage systems.

In another embodiment of the invention the visualization and/or client unit is e.g. calculating, transmitting, receiving, storing and displaying expectation values for any predetermined (i.e. selected, calculated or set by user or by de-fault) time up to the P-time after a given spot time.

In another embodiment of the invention the visualization and/or client unit is e.g. calculating, receiving, storing and displaying of price data distribution values for any predetermined (i.e. selected, calculated or set by user or by default) time up to the P-time. The price data distribution can be displayed for a predetermined (i.e. selected, calculated or set by user or by default) system of quantiles of price-range values that is either being static or dynamically defined for the given situation. The price data distribution is the probability of a given underlying price occurrence or over a given segmentation of prices.

In another embodiment of the invention the probability value is e.g. being determined under the assumption that either the take profit or the stop loss level is being hit once, and further price movements within a sample event are not being considered within the outcome determination.

In another embodiment of the invention, the price distribution or and/or price/trend change distribution at P-time (i.e. without earlier exit) is being calculated within the outcome determination unit using a sample and for the calculation of the probabilities via using a predetermined (i.e. selected, calculated or set by user or by default) set of price levels within said outcome determination unit for calculating the number/frequency or probability of hitting a given value above or below current price level and or for calculating the number/frequency or probability of having a price/trend change at set price levels, whereby said price-levels would be not being hit within the corresponding sample event again.

In another embodiment of the invention for each event within the sample, additionally price data are being extracted prior to the start time or time of trade situation examination, i.e. when the sample event has the same quantile vector. A bias-filter or unit or bias determination unit is comparing the percentage changes happening before the examined time, i.e. a predetermined (i.e. selected, calculated or set by user or by default) time-step before said examined or start-time in all events of the entire sample and tested trade situation. In this time-frame the prices has already changed, either it has increased in value, lost value or has stayed in a range—accordingly from the distribution of changes in the sample, price-changes can be associated to moods or biases in the market like bullish, very bullish, bearish, very bearish or neutral based on the percentage changes using standard deviations a seen in the change distribution. Then the percentage change within the tested or examined trading situation can be found in one of these ranges, and trades from the sample can be filtered according to the same biases and the statistical data that was calculated and or provided accordingly by the client in the same way as without these bias filtering. In a special embodiment of the invention, the bias filter is being transparent i.e. is it doing nothing if no bias is being considered and/or is filtering sample data/events according to a bias before statistics are being generated.

Additionally, the prices that are separating the trades of a given trade biases can be calculated for the entire time-range until the P-time and said prices can be determined from the sample via applying the method of determine the trade-bias separation prices on the prices directly prior to the time-step for which said separation prices are being determined. Additionally, the number of trades that are crossing these separation price lines up or down can be counted and associated to probabilities for each time-step for which these data are being calculated.

An isoline is a line or a corresponding value or values that can be connected with an equal value of a given type. A isoline probability prices are price values for equal probability values, i.e. price values which are e.g. only reached or hot first with the corresponding probability within a given sample.

In another embodiment of the invention all probability, expectation, bias separating prices, isoline probability prices and or price distribution data, trend change distribution and corresponding standard deviation or standard error values are e.g. being calculated for a given quantile vector only once and then being stored or cached on a server storage or unit, on the client storage or unit, on a database or on a filesystem or on a computer RAM memory; furthermore said data can also be calculated for different risk-to reward ratios or for different subsets of said sample, e.g. events filtered via association to different biases, and then being stored on the stored or cached on a server storage or unit, on the client storage or unit, on a database or on a filesystem or on a computer RAM memory so that if the same quantile vector is being calculated for a tested trade situation again, then the system can check if this quantile was already being processed before and the stored values can be loaded and used immediately. Moreover, metadata for the outcome of already calculated trading situation and for different risk-to-reward ratios can be generated from the results and being stored additionally or instead of the full amount of probability result data in order to avoid lengthy unnecessary reevaluations of large amount of probability data. These metadata can give advice on a preferred usage of said probability data or prevent the transfer of the data to the client because the underlying probabilities or statistical data don't suggest a successful trade.

In another embodiment of the invention the quantile vectors and risk-to-reward ratios or bias associations are within an index and they are used within an indexing of a table in which the index is referring or linking to additional metadata and probabilities or statistical data from previous calculations of the outcome determinations applied to same data context.

In another embodiment of the invention the quantile vectors and metadata are within an index and they are used within an indexing of a table in which the index is referring or linking to additional metadata and probabilities or statistical data from previous calculations of the outcome determinations applied to same data context.

In another embodiment of the invention the quantile vectors and minimal or threshold probabilities are within an index and they are used within an indexing of a table in which the index is referring or linking to additional metadata, risk-to-reward ratios and probabilities or statistical data from previous calculations of the outcome determinations applied to same data context, whereby said threshold probability is a probability value that is being set to a given value, while the actual probability is equal or above said threshold probability. The threshold probability could start at a value at which knowing the probability would make an impact for the profitability of a strategy used by the user or traders and the steps in which said threshold probability are being included in the index could be the step of 5 or 10 percentage points or any other value that the administrator, operator or user or trader has selected or has been set by default value.

In another embodiment of the invention, the variable probability value derived from the outcome determination is being used as a mutable, flexible, or changeable input variable within the trading decision making process and or as the input value of said trade decision making unit or trade recommendation unit.

In another embodiment of the invention only statistical probabilities which are higher than average and which are considered statistical outliers with 1.5 or 2 standard deviation or more above average are being considered as probability values used in the initial decision making or recommendation making for entering a trade. If additionally the risk-to-reward ratio indicates a statistical edge, then the decision making component or unit could initiate a trade or initiate a recommendation to a trader or a trading system.

In another embodiment of the invention not all indicator values, but only a predetermined (i.e. selected, calculated or set by user or by default) range of indicator values are assigned to quantile values, whereby non-assigned indicator values implies also that no corresponding quantile-vector is being generated and therefore no probability data are being calculated in the outcome determination unit. According to this embodiment of the invention, the range of acceptable indicator values is being part of the quantile-vector definition and is being used on the client when generating the quantile-vector and on the server or when creating the tables and or the files used to extract samples for examined event with said quantile vector value.

FIG. 1 is a schematic block diagram of one embodiment of a probability system 1. In the illustrated embodiment, the system 1 includes a data extraction unit 10. In some embodiments, the data extraction unit 10 is a component or unit in which price data are extracted from a stream of price data corresponding to a financial instrument. In some embodiments, the data extraction unit 10 extracts price data. In other embodiments, the data extraction unit 10 is designed to extract data related to a goal for the financial instrument (i.e. a future take profit (TP) price, stop loss (SL) price, and/or probability time (P-time) up to which the outcome of the situation may be determined). In some embodiments, the data extraction unit 10 can also be manually modified or may be automatically filled or provided preset data by a user or received from a server or other resource.

In some embodiments, the values extracted by the data extraction unit 10 are then analyzed to form one or more indicators. In some embodiments, the data is used to generate an ATR for determining the corresponding volatility and other characteristics. In some embodiments, the indicators are provided to the indicator calculator 50 which associates the indicators to categories or quantiles. In some embodiments, the indicator calculator 50 is a component or unit designed to take a value and associate that value to a quantile value using a calculation or association. In some embodiments, an association to volume categories and price-categories is done and used additionally with an ATR to limit the context of similar or identical samples for events that react to changes in volatility as traders would expect with respect to equities trades at certain volume or traded at certain prices.

In some embodiments, the indicator calculator 50 calculates technical or mathematical indicators from the extracted price data and then associates the value from each technical indicator to a corresponding category or quantile value. In some embodiments, the different quantile values are then put together in a quantile vector/array by the indicator calculator 50. In some embodiments, the indicator calculator 50 transforms the TP and SL price into a percentage value using the day opening price at which the financial instrument opened the trading day. In some embodiments, all or a portion of the values from the data extraction unit 10 and the indicator calculator 50 are turned into a quantile vector/array value that is provided to a sample extraction unit 60 of the probability system 1.

In some embodiments, the sample extraction unit 60 samples available historic data for the same or other financial instruments to look for similar or identical situations based on the quantile vector provided by the indicator calculator 50. In some embodiments, the sample extraction unit 60 is a component or unit that is designed to get sample data that are extracted from a storage system. For example, the storage system may include a filesystem, database, or computer memory (RAM). In some embodiments, the storage system is available and accessible to a server. In some embodiments, the extracted sample data constitute multiple arrays of records or a series of price or time-series data associated with a data record that has the same or similar associated quantile values as the quantile vector/array received from the indicator calculator unit 50. In some embodiments, the sample extraction unit 60 extracts samples that fall within a similarity threshold. In some embodiments, the similarity threshold is a percentage relative to the quantile vector of the financial instrument for which the probability is to be generated. Various degrees of relation are contemplated with regard to the similarity threshold.

In the illustrated embodiment, the probability system 1 includes an outcome determination unit 70. In some embodiments, the outcome determination unit 70 is a component or unit designed to determine the result of a test applied on a single sample. According to some embodiments, the outcome determination unit 70 determines if a time-series hit the given take-profit level(s), the given stop-loss-levels, or hit neither. In some embodiments, the outcome determination unit 70 receives multiple records from the sample extraction unit 60. In some embodiments, the outcome determination unit 70 receives the records after a bias filter 80 has been applied to the samples.

In some embodiments, the bias filter unit 80 is a component designed to analyze the data prior to sending the data to be analyzed by the outcome determination unit 70. In some embodiments, the bias filter unit 80 determines whether the data, at a given starting point, is determined to have a change prior to said starting point which allows the data to be associated to a market trend (e.g. bearish, neutral, or bullish).

In some embodiments, the outcome determination unit 70 maintains the data of a sample in their timely sequence consecutively or maintains the data sorted in their timely order without omissions from the original data. In some embodiments, substantially all sample data are processed in the outcome determination unit 70. In some embodiments, the sample data consists of a set of timely order OHLC price data within a certain timeframe. In some embodiments, the data for the corresponding sample includes the start time, at which the sample has a price record with the same or similar quantile vector as the trade situation to be forecasted. In some embodiments, the outcome determination unit 70 transforms the price data into a higher time frame OHLC. In some embodiments, the open price of the first OHLC and the close of the last OHLC is used In some embodiments, some or all of the available OHLC records are taken. In other embodiments, the minimum of some or all low price values and the maximum of some or all high price values of said OHLC data are taken and associated to the corresponding Low and High of the new OHLC record.

In some embodiments, the outcome determination unit 70, for each sample, stops when a price is at or above the take profit price level or at or below the stop loss price level before the P-time is reached. In some embodiments, the outcome determination is done for each sample element (i.e. for each time-series separately and or in parallel using vector processing). In some embodiments, the output of the outcome determination unit 70 is sent to an occurrence counter unit 75.

In some embodiments, the occurrence counter unit 75 is a component or unit designed to count each of the outcomes from the outcome determination unit 70. For example, the occurrence counter unit 75 may count one or more of hitting take profit, hitting stop loss, or hitting neither within the time to P-time. In some embodiments, the occurrence counter unit 75 then divides these numbers by the total number of occurrences to obtain an average corresponding to a probability value. In some embodiments, the occurrence counter unit 75 provides the corresponding probability value to the probability output unit 100. In some embodiments, the probability output unit 100 is a component or unit that displays the probability data within a chart or a table or within some other computer displaying component.

In some embodiments, the probability output unit 100 bundles the events from the samples into sets of about 100 events. In some embodiments, the probability output unit 100 associates the result, after the occurrence counter unit 75 counts it, to a corresponding probability record. In some embodiments, additional bundles are associated with additional probability values. In some embodiments, the probability result is the average of all probabilities from the bundles of events. In some embodiments, the statistical error is the standard deviation of the probability value distribution around the average probability value.

In some embodiments, because the number of events in the sample may be unknown, the segmentation of the sample into bundles is done to accommodate a low event count. In some embodiments, the low count number event are put into a few bundles, in a single bundle, or with higher count events, which are then distributed into a larger number of bundles or buckets. In some embodiments, this distribution provides a good trade-off between computation effort and average value accuracy. In some embodiments, a maximum of eighty bundles or buckets as a maximum number of studied bundles provides a good compromise. In some embodiments, if the number of buckets is too small (e.g. below about fifty), then a Student distribution may be used to calculate the Standard Deviation. In other embodiments, if the number of buckets is above about fifty, a Gaussian normal distribution may be used.

In some embodiments, the bias filter unit 80 selects subsets of categorized sample events (time-series), from the full sample data, which are associated with criteria that is related to the different biases. In some embodiments, the full sample data is derived from the distribution of changes prior to the start-time where all samples and trade situation have the same quantile vector. In some embodiments, the bias filter unit 80 can also be called after the outcome determination unit 70, as different embodiments implement the bias filter 80 within the system 1 in different manners. In other embodiments, different biases are accessed at P-time or at some other predetermined time before the start time of the samples.

In the illustrated embodiment, the probability system 1 also includes a user display unit 102. In some embodiments, the user display unit 102 is a local or remote display unit relative to the probability system 1. In some embodiments, the user display unit 102 is a monitor. In other embodiments, the user display unit 102 is a mobile device. In some embodiments, the user display unit 102 is a private or public display.

In the illustrated embodiment, the user display unit 102 is managed by a display manager 104 of the probability system 1. In some embodiments, the display manager 104 coordinates the information that is displayed on the user display unit 102. For example, the display manager 104 may display, on the user display unit 102, the financial instrument for which the probability is to be determined. In some embodiments, the information regarding the financial instrument is a data stream that is displayed on the user display unit 102. In some embodiments, other information is selected by the display manager 104 to be displayed on the user display unit 102 as described in more detail below with reference to FIG. 4.

Figure 2:
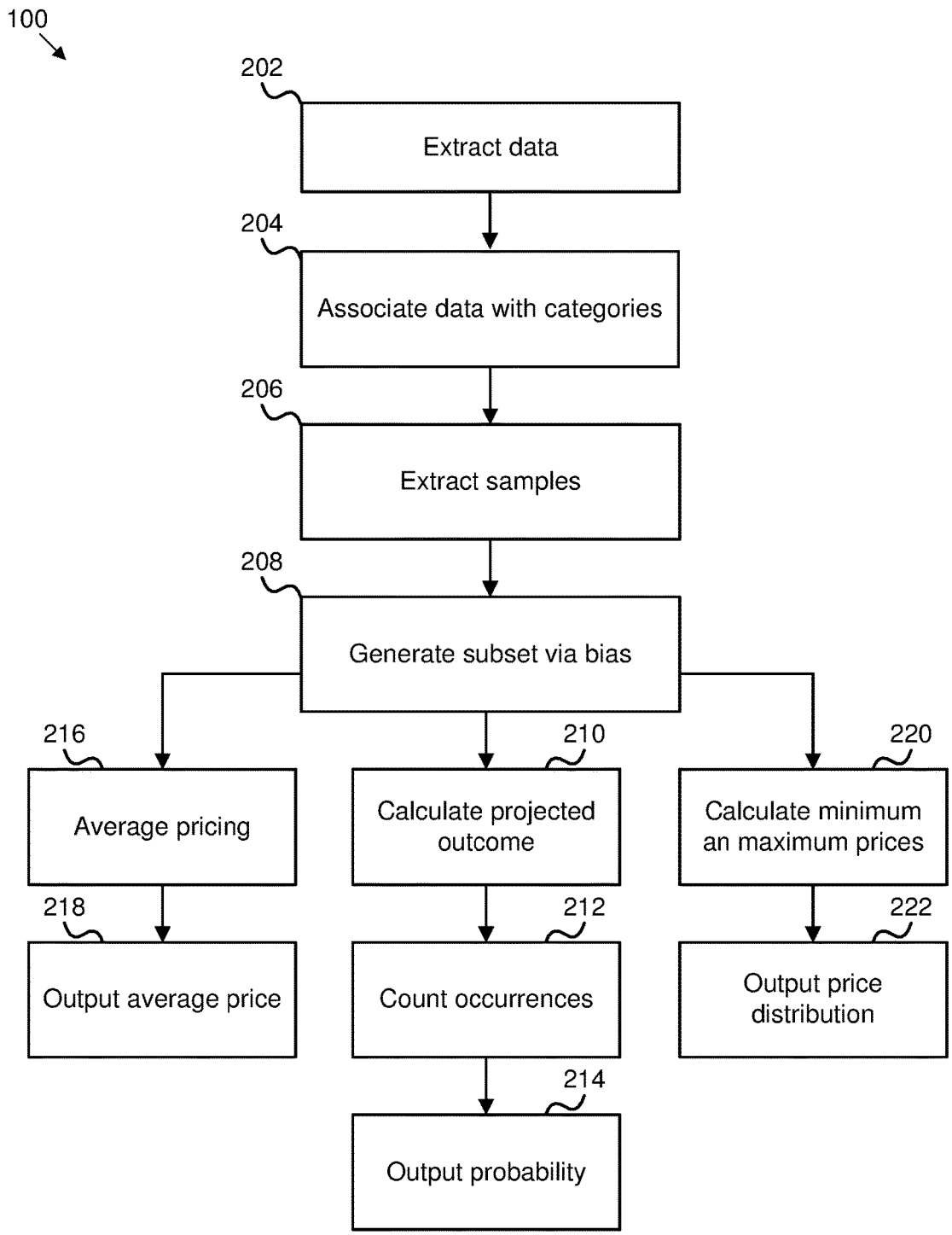
FIG. 2 is a schematic block diagram of one embodiment of a method for determining a statistical probability.

FIG. 2 is a schematic block diagram of one embodiment of a method for determining a statistical probability. In the illustrated embodiment, the method 200 includes, at block 202, extracting data. In some embodiments, extracting data includes extracting price data and goal related data. In some embodiments, at least one of the price data and the goal related data includes at least one of take profit price level, stop loss price level, and P-time value.

In the illustrated embodiment, the method 200 also includes, at block 204, associating the data with categories. In some embodiments, associating the data with categories includes associating price data with quantile values. In some embodiments, the quantile values are further associated with a quantile vector. In some embodiments, the price level is associated with relative percentage values (for example, price value such as the open price of the corresponding OHLC price tuple).

In the illustrated embodiment, the method 200 further includes, at block 206, extracting samples. In some embodiments, the quantile vector is used to extract a sample of events consisting of time-series data. In some embodiments, samples having quantile vectors similar or identical to that of the time-series data for the financial instrument are extracted.

In the illustrated embodiment, the method 200 further includes, at block 208, generating a subset via biasing. In some embodiments, the extracted samples are segmented into subsets. In the illustrated embodiment, the method 200 further includes, at block 210, calculating a projected outcome. In some embodiments, the outcome determination is processed in subsets. In other embodiments, the outcomes are processed on the entire sample in parallel.

In the illustrated embodiment, the method 200 further includes, at block 212, counting occurrences. In some embodiments, the outcomes which meet or exceed one or more goal criterion are counted. For example, outcomes which at least one of hit take profit level, hit stop loss level, or neither within a time period are counted.

In the illustrated embodiment, the method 200 further includes, at block 214, outputting a probability. In some embodiments, the probability is output by displaying the output on an output device. Some example of a display arrangement are described below with reference to FIG. 4.

In some embodiments, the subsets from block 208 or the sample set from block 206 are processed, at block 216, with respect to an average price per time-spot value. In some embodiments, the average is calculated based on one or more corresponding percentage values. In some embodiments, the method 200 further includes, at block 218, outputting the average price. In some embodiments, the average value, also called an expectation value, is calculated and provided for displaying on a corresponding output device.

In some embodiments, the subsets from block 208 or the sample set from block 206 are processed, at block 220, with respect to a maximum gain and/or maximum loss over some or all time-spot values. In some embodiments, the maximum gain and loss values are calculated based on the corresponding percentage values. In some embodiments, the method 200 further includes, at block 222, in which the values, also called price data distributions, are provided for displaying on a corresponding output device.

Figure 3:
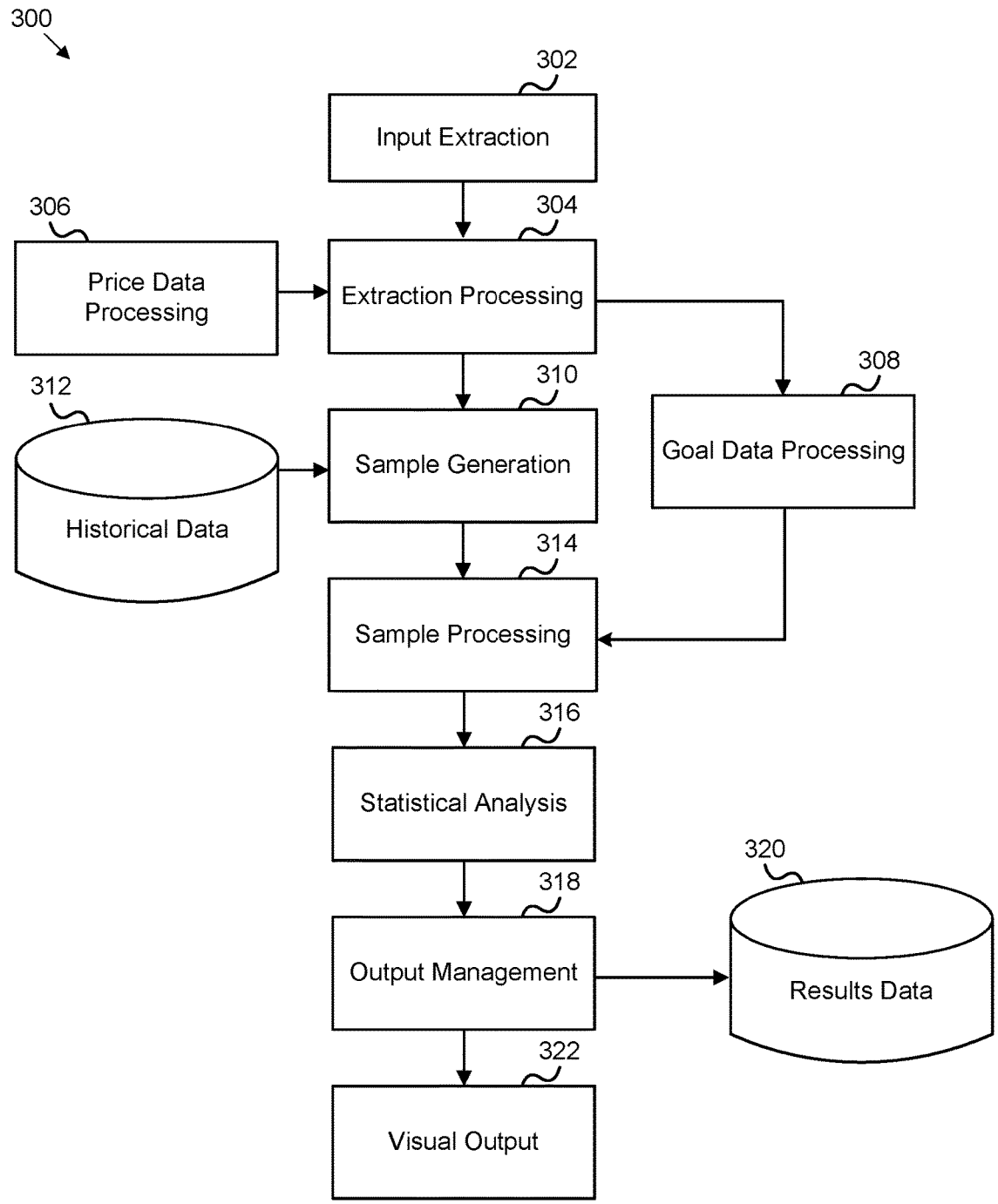
FIG. 3 is a schematic diagram of one embodiment of a software architecture model 300 capable of determining a statistical probability.

FIG. 3 is a schematic diagram of one embodiment of a software architecture model 300 capable of determining a statistical probability. In the illustrated embodiment, the model 300 includes an input extraction unit 200. In some embodiments, the input extraction unit 302 determines a price for a financial instrument. In some embodiments, the input extraction unit 302 provides context to a user by selecting and displaying corresponding price data related to the examined financial instrument and additional data corresponding to the financial instrument and other financial instruments. In some embodiments, the input extraction unit 302 extracts all data which are required to calculate the indicator values.

In the illustrated embodiment, the input extraction unit 302 provides the extracted data to the extraction processing unit 304. In some embodiments, the extraction processing unit 304 determines the indicators based on the extracted data. In some embodiments, a price data context determination unit 306 determines the take profit level, stop loss level, and the P-time value provided. In some embodiments, a goal data processing unit 308, determines and selects goal related data. In some embodiments, the extracted data are provided to a sample generation unit 310. In some embodiments, the sample generation unit 310 or other components of the model 300 are located on a server, which has access and or is providing references to historical data 312 organized into records with price data stored as time-series. In some embodiments, the sample generation unit 310 receives, from the extraction processing unit 304, a quantile vector. In some embodiments, the sample generation unit 310 searches the historical data 312 to identify one or more samples which have comparable quantile vectors and which include a price data time-series. After the sample events are extracted, a sample processing unit 314 transforms the price data into a form so that outcome determination, occurrence counting, and other transformations or data preparations can be done using goal data from the goal data processing unit 308, so that the data can be statistically analyzed by a statistical analysis unit 316.

In some embodiments, the outcome of the statistical analysis unit 316, which is, in one embodiment of the invention, executed on a server and then sent to a client-sided output management unit 318. In some embodiments, the output management unit 318 further stores the data to a client-side results data repository 320. In other embodiments, the output management unit 318 outputs the values to a visual output unit 322. In some embodiments, the statistical analysis unit 316 writes the output to a server-side version of the results data repository 320 and allows the output management unit 318 to receive data from the results data repository 320.

Figure 4:
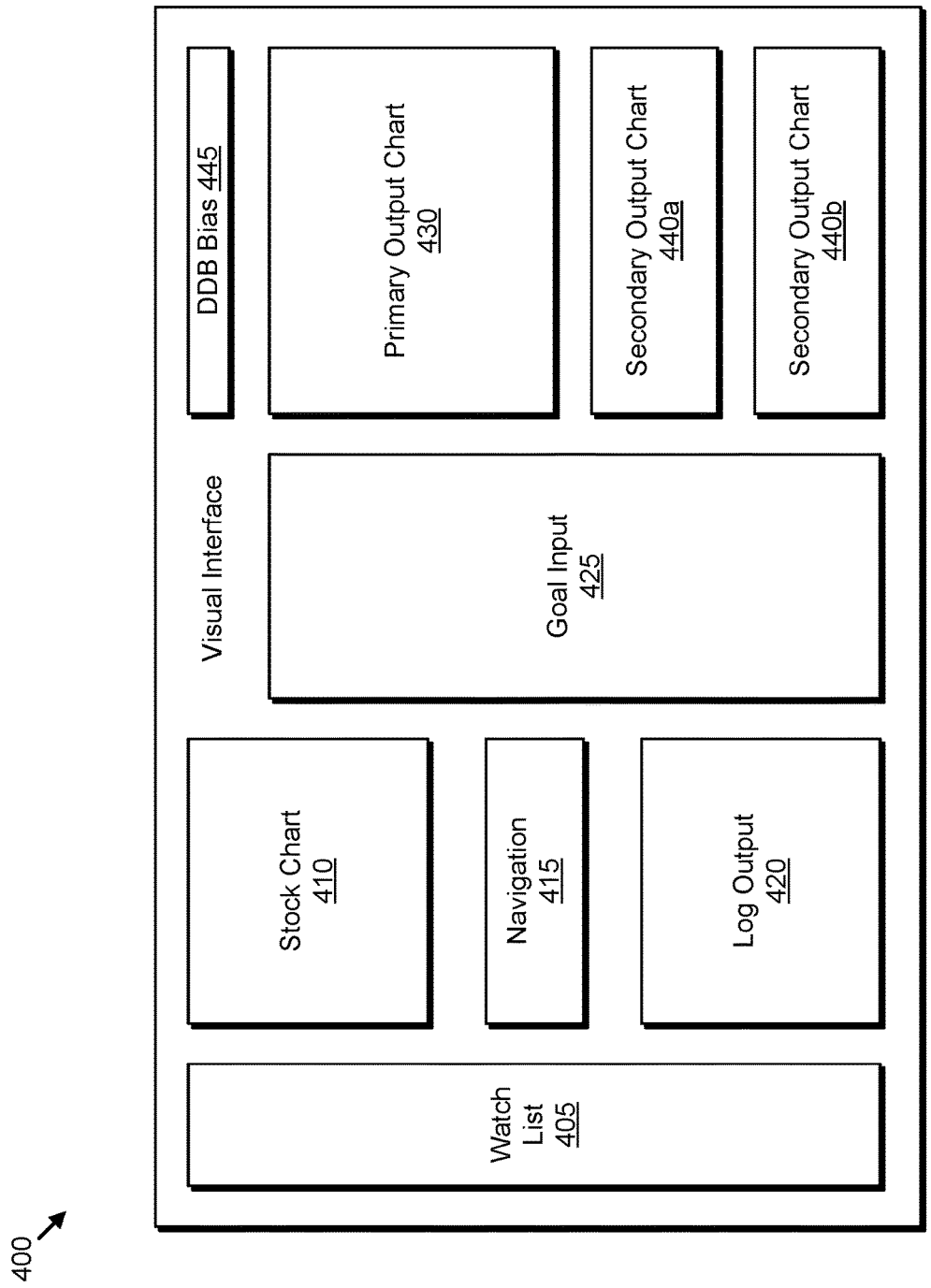
FIG. 4 is a schematic diagram of one embodiment of a visual interface for displaying financial instrument data.

FIG. 4 is a schematic diagram of one embodiment of a visual interface 400 for displaying financial instrument data. In the illustrated embodiment, the visual interface 400 includes a watch list 405 to display a list of stocks (via their names) or other financial instruments that, when activated by the user, displays price data within a stock chart 410. In some embodiments, some or all values that are extracted and/or displayed are associated to a corresponding stock symbol in the watch list 405. In some embodiments, the user can select a time spot via a navigation control 415. In some embodiments, the selection of the time spot affects data shown in a goal input control 425 data to determine, confirm, or modify the take profit level and/or stop loss level and/or the P-time value (i.e. the time-left value to the end of the trade) and the considered direction of the trade (long or short). In some embodiments, when extracted, the values from the stock chart 410 and the coal input control 425 (for example, the probability data and/or exception value and/or price data distribution values and/or corresponding error data) are received 420 and displayed either in the primary output chart 430 or one of a first and second secondary output charts 440a and 440b respectively.

In some embodiments, the displayed data can be changed within the visual interface using the dropdown box (DDB) 445. In some embodiments, the dropdown box 445 changes the output of probabilities related to a selected bias category such as bullish, bearish, neutral, or no bias. Other variables and factors may be adjusted and shown via the DDB 445.

Figure 5:
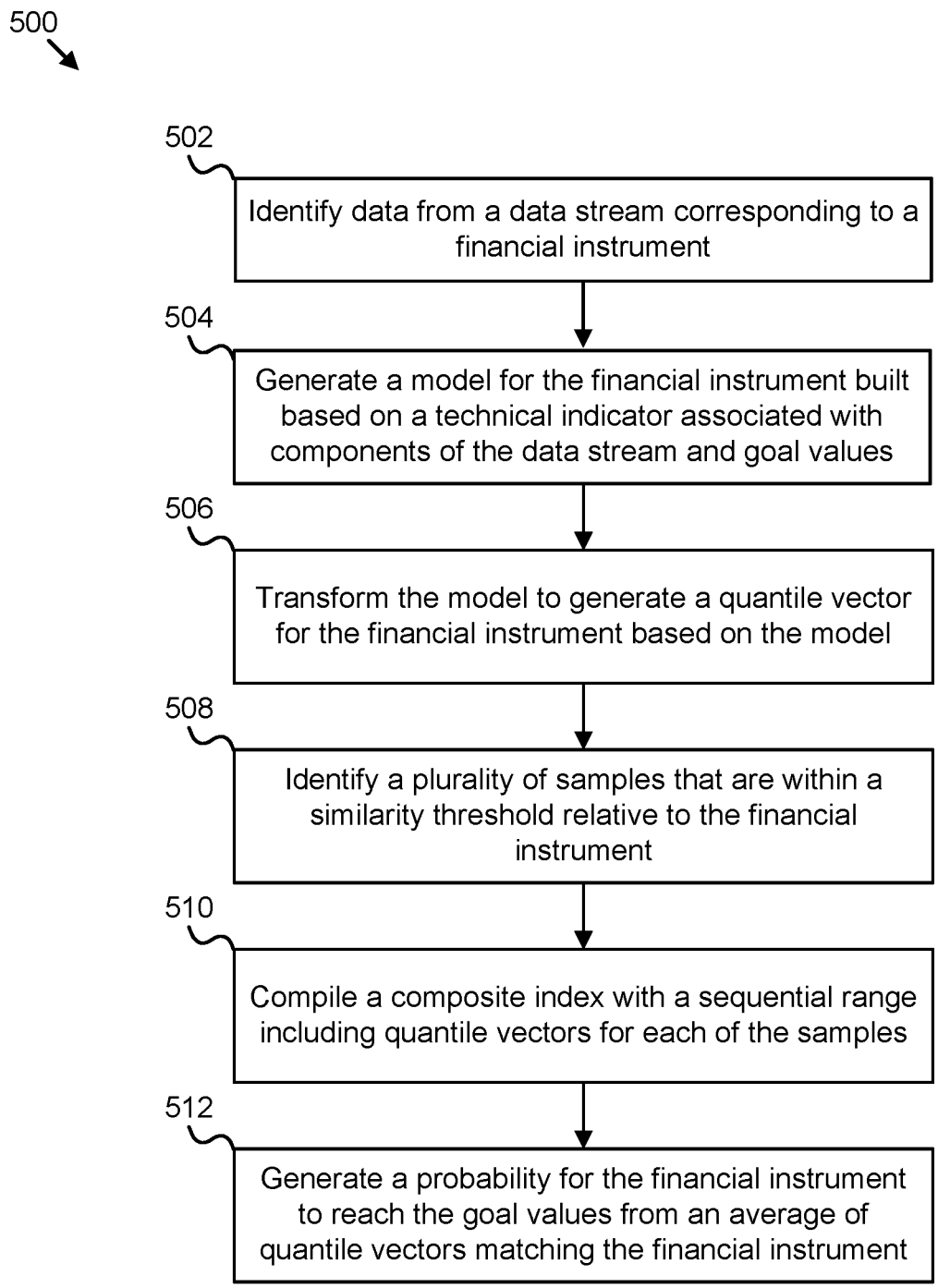
FIG. 5 is a schematic flowchart of one embodiment of another method for determining a probability for a financial instrument.

FIG. 5 is a schematic flowchart of another method 500 for determining a probability for a financial instrument. In the illustrated embodiment, the method 500 includes, at block 502, identifying data from a data stream corresponding to a financial instrument. In some embodiments, the data stream includes time-series historical data corresponding to the financial instrument.

At block 504, the method 500 further includes generating a model for the financial instrument built based on a technical indicator associated with components of the data stream and goal values. In some embodiments, generating the model for the financial instrument includes building the model from one or more technical indicators of the financial instrument. In some embodiments, the technical indicators are based on one or more extracted components of the time-series historical data and at least one goal value associated with the financial instrument.

At block 506, the method 500 further includes transforming the model to generate a quantile vector for the financial instrument based on the model. In some embodiments, applying the transformation to the model includes generating a quantile vector associated with the financial instrument based on one or more quantile values. In some embodiments, the quantile values are derived from the model for the financial instrument. For example, the quantile values may be based on an analysis of the historical data and goal data associated with the financial instrument.

At block 508, the method 500 further includes identifying a plurality of samples that are within a similarity threshold relative to the financial instrument. In some embodiments, identifying the plurality of samples includes identifying samples having time-series historical data within a similarity threshold relative to the time-series historical data of the financial instrument. In some embodiments, the similarity threshold describes a certain percentage similarity. For example, the threshold may be a 90% similarity. Other percentages and thresholds are also contemplated.

At block 510, the method 500 further includes compiling a composite index with a sequential range including quantile vectors for each of the samples. In some embodiments, compiling the composite index includes compiling a composite index of quantile vectors determined for each of the plurality of samples. In some embodiment, the composite index includes a single sequential range of vector values.

At block 512, the method 500 further includes generating a probability for the financial instrument to reach the goal values from an average of quantile vectors matching the financial instrument. In some embodiments, generating the probability includes generating a probability for the financial instrument to reach the goal values by determining an average number of quantile vectors of the composite index matching the quantile vector of the financial instrument. In some embodiments, the probability value is split up into categories associated with each goal value of the financial instrument.

Further advantages and utilizations of the present invention are also obtained by using previously processed, received, and stored price, probability, and expectation data on the visual interface within a study mode. The previously processed, received and stored price, probability, and expectation data and or statistical data can be stored on a client appliance, i.e. a system that requires no network access or on a server appliance, in which a user has remote access via an electronic data network.

Furthermore, in another embodiment of the invention, the goal insert and data or goal extraction unit can allow the user to extend/change the P-time (time to the set end of the trade) in which the take profit or stop loss criteria is being processed within the outcome determination unit and the criteria is being fulfilled or not, whereby the user or an automatic decision making unit can change the take profit or stop loss level. Furthermore, the operator of the software can also change these levels within the chart and receive correspondingly changed probability, expectation and/or price distribution data and/or price/trend change distribution data from the server or the corresponding data calculation/providing unit. Moreover, the change of TP/SL values, a change in the P-time can be marked with a line within the probability charts, when probabilities are tracked, because a change of P-time is significantly changing the probabilities; same can apply to a change of the take profit or stop loss price level.

Moreover, the buy-price of the equity can be marked via a cross-line within the chart that is used to display the equity price data. A horizontal line would indicate the entry price, while a vertical line may indicate the entry time of the corresponding real or paper (virtual) trade. Additionally, the corresponding stop loss level and take profit level can be marked as horizontal lines within that price chart. In some embodiments, they can be colored in red for the stop loss level and green for the TP level.

Furthermore, in another embodiment of the invention the visualization system can contain a unit which is approximating a future price movement using data taken from expectation values at different time-ranges and or a normal distribution of price data or data representing the projected future price data distribution from the analysis of a corresponding sample taken with the same initial quantile vector. This unit would draw e.g. a normal distribution curve for average and standard deviation data available on the client within a visualization component or data from the actual current price distribution and/or price/trend change distribution as determined via data received from the outcome determination unit. This component could show also how price data have a tendency to higher or lower prices, i.e. it would show a skewed curve with a bulk of data left or right (up or down) from an average or midpoint. Furthermore, this displaying system/component can use a different or more adapted quantile systems to show the price data distribution, e.g. based on the determined/calculated biases, with a trend to higher or lower prices according to a bullish or bearish sentiment. Furthermore, the displaying unit can display the actual distribution data from the outcome determination unit or an approximated or smoothed curve using spline interpolation or any other equivalent system that is an interpolation of said data.

In another embodiment of the invention the visualization unit can also display bias separating prices and/or probability prices on top of the start while relative price is transformed into absolute price values or scale used in the equity or by chart.

In another embodiment of the invention, the charts to display the expectation and/or price data distribution values can have a slider that a user can change, in which he can display previously received/provided/calculated expectation data and/or price data distribution curves, with the purpose that the user can chose an earlier time for related expectation or price distribution values and/or price/trend change distribution and compare previously projected values and actual values which could demonstrate that the statistics is not making any concrete prediction about a single event.

In another embodiment of the inventions, the SL/TP and P-time values are set manually or automatically. Additionally, a special embodiment of the invention can determine and calculate with the knowledge of hindsight if these modifications were good or bad for the goal set by the user or trader and by how much.

Furthermore, the server and/or corresponding data calculation/providing unit can calculate different probability, expectation and price data distribution based on the bias/sentiment; within the sample of comparable or selected or extracted events. In each sample, there are values or price-movements which are larger in both directions. These price-movements are approximately normal distributed and can be segmented in three categories: bullish, bearish, and neutral with each about ⅓ of the total number of events. Moreover, events within the sample which are less than +/−0.5 Standard Deviations (SD) away from the average are considered neutral trades, trades larger away i.e. more than plus 0.5 SD, are bullish, while smaller than minus 0.5 SD are bearish trades. Furthermore, trades that are larger away than +1.5 SD are very bullish, while smaller than −1.5 SD are very bearish trades. There are several methods to put the trades in one of the above 5 categories; in an embodiment of the invention, the price value at the end of the P-time can e.g. be used to determine the corresponding category. For each of these sets of events within the sample, the corresponding probability data, expectation values and/or price curves can be calculated in the outcome determination unit and stored on the server storage unit, and provided to the client for displaying and/or storing or usage in a client sided decision making. Furthermore, the user interface can provide a drop-down box (DDB) to select the corresponding value(s) for displaying and or usage within the visual interface/form and/or within the charts.

Data calculated on the server and/or the corresponding data calculation/providing unit are based on percentage values, calculated with respect to a commonly determined price point (e.g. the open and/or close price or an average or weighted average of both). In another embodiment of the invention, this percentage value is e.g. being transformed either on the server or on the client to a price value that is in line or calibrated with the dollar amount of the stock/equity for which data are calculated. In that way, the dollar value (or the value in any other currency) of the expectation values and or the price distribution and/or price/trend change distribution values and/or bias separating prices and or probability prices have the same percentages to the open/close values as calculated by the percentage values.

In another embodiment of the invention, the parameter used within the indicators or quantile computation process are e.g. stored on the client and shared with the server or stored on the server and shared with the client.

In another embodiment of the invention the probability data, expectation data and or price distribution data and/or price/trend change distribution and/or bias separating prices and or probability prices and corresponding standard derivatives and or statistical errors received from the server system can also be stored on the server and provided to the client on demand by algorithms or via interacting with the user.

In another embodiment of the invention the statistical error is calculated for the samples, potentially stored on the server. Additionally, statistical error are being provided for the corresponding results and they are being displayed in the probability, expectation or price data distribution charts or in separate charts. In a special embodiment of the invention the statistical error can be displayed via a thinner line or via error bars on known values within charts or curves. Additionally, also the second standard deviation on the sample distribution can be stored and displayed on the client.

In another embodiment of the invention the user of the client software can initiate trades from the visual interface related to stocks displayed in the chart interface at the current price point of the stock together with exiting trades in order to get the trades ended at the take-profit level or at the stop-loss level, or defined via percentages or defined on the server using additional information about expected volatilities (based on additionally extracted context values) or at the predetermined (i.e. selected, calculated or set by user or by default) time at the end of said trade. Additionally, trades can be exited using exit components operating on a remote server using data related to the TP, SL price level and the P-Time.

Additionally, context-dependent statistical probabilities are more valuable if they are provided in a real-time or near-real-time manner, i.e. at the time when they are used for the decision making. In a special embodiment of the invention real-time statistical probabilities or statistical values using real-time price data should be provided in a few minutes or even better within a few seconds after the last real-time price data record has been received by the probability calculation and or display and or trade decision or management.

A strong statistical edge is given if the win-probability times the reward amount, i.e. the gain amount, is larger than the risk amount, i.e. the loss amount, times (1 minus win-probability), whereby probabilities are values between 0 and 1. Furthermore win-probability is the probability of hitting the take profit first. The loss probability is probability of hitting the stop-loss level first. The expectation value is the average price of trades within an ensemble of sample events that neither hit the stop loss nor the take profit level, whereby the winning and losing expectation values are the average prices of trades within an ensemble of sample events that are winning or losing but didn't hit the stop loss nor the take profit level. These expectation values are gain or loss values, i.e. in said values the averages of prices at the time of enter have already been subtracted. Also long and short trade considerations have already being included via the use of profit/loss terms as well.

The above definition of a statistical edge would assume that all non-winning trades are losing with their maximum loss at the stop-loss level. Therefore, a weak statistical edge definition is when the win-probability times the reward amount plus the winning expectation value difference is larger than the positive risk amount times loss probability plus the losing expectation value difference, whereby the difference values are being taken with the use of trade entry price and difference prices considered to be positive.

In the context of the current invention a statistical edge is therefore either a strong or weak statistical edge. Furthermore, the statistical edge amount is a value, in which the risk side of the statistical edge equation is being subtracted from the reward side and when the resulting value is positive, then the trader or user has an edge or trading advantage. If the statistical edge amount is negative, then the corresponding trade has a much higher chance of losing consistently.

In another embodiment of the invention, the outcome determination unit is not only counting the number or probabilities of winners, i.e. having hit the take profit level first, and the number or probabilities of losers, i.e. having hit the stop loss level first, and the number or probabilities of nothing happens i.e. neither stop loss or take profit happens at the end of the maximum set trade-time, but then also either one or more of the following number or probabilities can be determined or calculated by said determination unit: number or probabilities of winners at end of the maximum set trade-time without counting the number of take profit price level hits or reduced by said number, number or probabilities of losers at end of the maximum set trade-time without counting the number of take profit price level hits or reduced by said number, number or probabilities of collision trades, i.e. trades that move so fast i.e. so high/low up or down within one candlestick that it hit the take profit and stop loss within the same timeframe or candlestick, so that it can't be determined what level was hit first and number or probabilities of false positive, i.e. trades that hit the stop-loss first and then hit the take-profit level. Moreover the outcome determination unit can determine or calculate the expectation value, the winning or losing expectation values at end of the maximum set trade-time. Furthermore, the outcome determination unit can determine or calculate the standard deviations for the expectation values, the winning or losing expectations values at end of the maximum set trade-time as well.

In another embodiment of the invention, outcome determination of sample events within the sample are being used to determine the risk-to-reward ratio based on a certain threshold percentage, i.e. 30% above a take-profit level within said sample, then different risk-to-reward ratios are being determined; i.e. what are the percentages that hit within these different scenarios the stop-loss level and what are the false positive percentages. The weak or strong statistical edge criteria can be applied and the highest statistical edge amount can be used as the selection criterium for getting the best pair of risk-to-reward ratio and win-probability values as a basis for a trade recommendation on the risk to reward ratio.

In another embodiment of the invention, outcome determination of sample events within the sample are being used to determine the price distribution, i.e. the frequency or number of occurrences of maximum or minimum prices provided by the sample.

In another embodiment of the invention, the outcome determination unit is a special dedicated hardware to calculate the statistical data related to a given sample.

In another embodiment of the invention, the outcome determination unit and sample extortion unit and sample storage unit and price data storage unit is a special dedicated hardware to generate samples, determines outcome and calculates the statistical data related to a given sample.

The preceding depiction of the collaborative CAx applications and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing a real-time probability, the method comprising:
   generating a model based on time-series historical data for a financial instrument, the model built from one or more technical indicators of the financial instrument based on one or more extracted components of the time-series historical data and goal values associated with the financial instrument;
   applying a transform to the model, the transform generating a quantile vector associated with the financial instrument based on one or more quantile values derived from the model for the financial instrument;
   compiling a composite index of quantile vectors, each of the quantile vectors corresponding to a plurality of samples having time-series historical data within a similarity threshold relative to the time-series historical data of the financial instrument, wherein the composite index comprises a single sequential range of vector values; and
   generating, by a processor, a probability for the financial instrument to reach the goal values by determining an average number of quantile vectors of the composite index matching the quantile vector of the financial instrument.

2. The method of claim 1, wherein each quantile value comprises an integer.

3. The method of claim 1, further comprising displaying the probability for the financial instrument on a display device.

4. The method of claim 1, wherein the probability for the financial instrument comprises a plurality of probabilities with at least one of the plurality of probabilities corresponding to at least one of the goal values associated with the financial instrument.

5. The method of claim 1, wherein the goal values comprise at least one of a list of values comprising a take profit level, a stop loss level, and a timeframe.

6. The method of claim 1, wherein each of the quantile values is determined based on one or more of the technical indicators of the financial instrument.

7. The method of claim 1, wherein the quantile vector associated with the financial instrument is a single array comprising the quantile values for the financial instrument.

8. A computer program product comprising a computer readable storage medium having program instructions embodied therewith, the program instructions readable/executable by a processor to cause the processor to:
   generate a model based on time-series historical data for a financial instrument, the model built from one or more technical indicators of the financial instrument based on one or more extracted components of the time-series historical data and goal values associated with the financial instrument;
   apply a transform to the model, the transform generating a quantile vector associated with the financial instrument based on one or more quantile values derived from the model for the financial instrument;
   compile a composite index of quantile vectors, each of the quantile vectors corresponding to a plurality of samples having time-series historical data within a similarity threshold relative to the time-series historical data of the financial instrument, wherein the composite index comprises a single sequential range of vector values; and
   generate, by the processor, a probability for the financial instrument to reach the goal values by determining an average number of quantile vectors of the composite index matching the quantile vector of the financial instrument.

9. The computer program product of claim 8, wherein the real-time data stream corresponds to at least one of a list of sources, the list comprising an auction, a Forex, a stock exchange, and a commodity exchange.

10. The computer program product of claim 8, wherein at least one of an identifier for the financial instrument, the goal values, and the similarity threshold are stored to a user profile.

11. The computer program product of claim 10, further comprising extracting at least one of the financial instrument, the goal values, and the similarity threshold from the user profile.

12. The computer program product of claim 8, further comprising referencing and displaying a sample financial instrument in response to a determination that the quantile vector of the associated sample is within the similarity threshold.

13. The computer program product of claim 8, further comprising applying a corrective function in response to detection of one or more gaps in one or more of the plurality of samples.

14. The computer program product of claim 8, further comprising dividing data for one or more of the plurality of samples and the financial instrument into subsets of data.

15. A computer system comprising:
a processor;
a memory accessible by the processor; and
a computer readable medium having instructions encoded thereon to:
generate a model based on time-series historical data for a financial instrument, the model built from one or more technical indicators of the financial instrument based on one or more extracted components of the time-series historical data and goal values associated with the financial instrument;
apply a transform to the model, the transform generating a quantile vector associated with the financial instrument based on one or more quantile values derived from the model for the financial instrument;
compile a composite index of quantile vectors, each of the quantile vectors corresponding to a plurality of samples having time-series historical data within a similarity threshold relative to the time-series historical data of the financial instrument, wherein the composite index comprises a single sequential range of vector values; and
generate, by the processor, a probability for the financial instrument to reach the goal values by determining an average number of quantile vectors of the composite index matching the quantile vector of the financial instrument.

16. The computer system of claim 15, wherein the probability for the financial instrument comprises a plurality of probabilities with at least one of the plurality of probabilities corresponding to at least one of the goal values associated with the financial instrument.

17. The computer system of claim 15, wherein the goal values comprise at least one of a list of values comprising a take profit level, a stop loss level, and a timeframe.

18. The computer system of claim 15, wherein each of the quantile values is determined based on one or more of the technical indicators of the financial instrument.

19. The computer system of claim 15, wherein the quantile vector associated with the financial instrument is a single array comprising the quantile values for the financial instrument.

20. The computer system of claim 15, wherein at least one of an identifier for the financial instrument, the goal values, and the similarity threshold are stored to a user profile.

* * * * *